Mar. 13, 1923.
M. C. HUTCHINSON
DYNAMIC BALANCING DEVICE
Filed Feb. 28, 1919  2 sheets-sheet 1
1,447,985
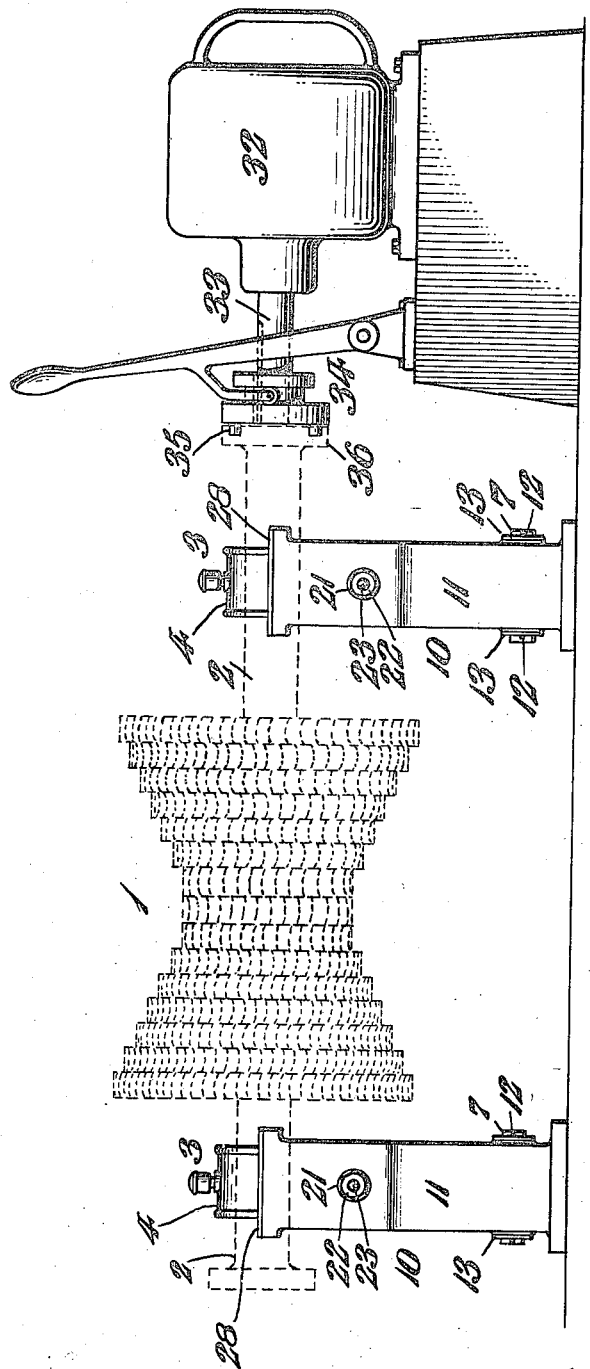

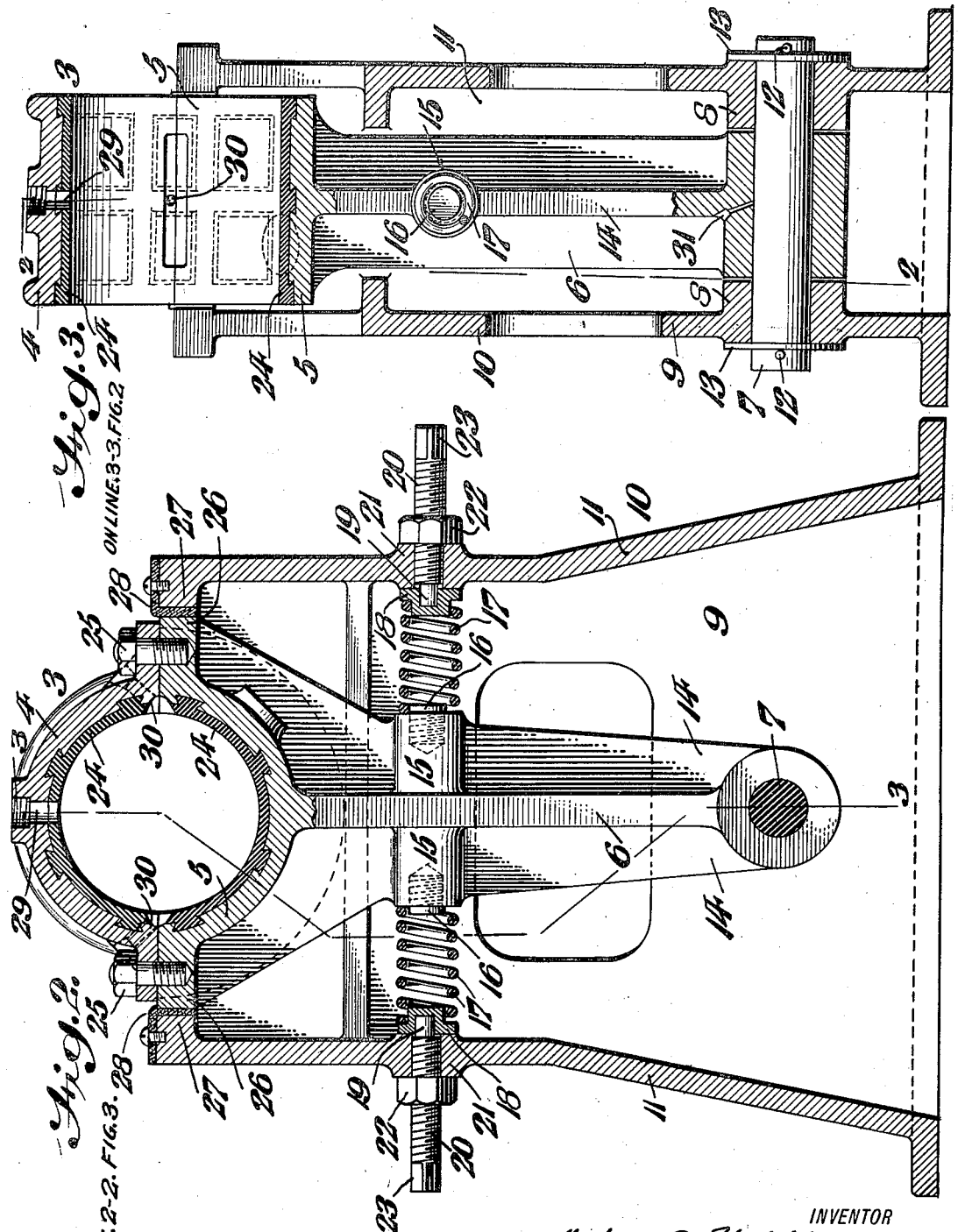

Patented Mar. 13, 1923.

1,447,985

UNITED STATES PATENT OFFICE.

MORTON C. HUTCHINSON, OF WOODBURY, NEW JERSEY, ASSIGNOR OF ONE-HALF TO LEON G. BUCKWALTER, OF MERCHANTVILLE, NEW JERSEY.

DYNAMIC BALANCING DEVICE.

Application filed February 28, 1919. Serial No. 279,757.

*To all whom it may concern:*

Be it known that I, MORTON C. HUTCHINSON, a citizen of the United States, residing at Woodbury, in the county of Gloucester, State of New Jersey, have invented a new and useful Dynamic Balancing Device, of which the following is a specification.

It has heretofore been the practice in balancing a rotor for a steam turbine after finishing or machining it to assemble said rotor with respect to its stator in the turbine casing, and then to conduct steam into the turbine casing to the turbine and observe the operation of the rotor under ordinary working conditions. If, however, the rotor is not properly balanced both statically and dynamically, it becomes necessary to remove the cap from the turbine casing, lift out the rotor and further machine or balance the same by various devices now in vogue. Owing to the very high angular velocity particularly of rotors for turbines, new problems of balancing have arisen, which have necessitated provision for a very much greater precision in balancing these rotors than heretofore, where it has been found sufficient to bring the rotor to a good static balance. In the newer or recently constructed high speed turbines, these old methods of balancing have proved in practice to be entirely inadequate, and the need has arisen for a further refinement or accuracy of balance of the rotor, which I have succeeded in accomplishing by the novel method and apparatus hereinafter described.

It consists of a novel construction of oscillating bearings supported upon a long arm depending from the bottom of the lower half of the bearing, and provided with a suitable fulcrum at the bottom of a hollow box housing or pedestal, whereby an inverted pendulum is formed, in conjunction with helical springs provided with tension adjustments which are adapted not to constrain the vibrations of said inverted pendulum or pendant arm during the process of dynamically balancing the rotor, but to sustain it in a vertical position.

To the above ends, my invention consists of the novel method and apparatus hereinafter referred to and particularly pointed out in the claims.

It further consists of other novel features of construction and advantage, all as will be hereinafter fully set forth.

For the purpose of illustrating my invention, I have shown in the accompanying drawings, one form thereof which is at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents diagrammatically a front view of a pair of the oscillating bearings seen in Figures 2 and 3 which I employ in dynamically balancing the rotor, together with a motor, a clutch and its adjuncts for effecting the rotation of the rotor and its shaft during the balancing operation.

Figure 2 represents a vertical sectional view on line 2—2 Figure 3, certain parts being shown in elevation, showing one of the oscillating bearings employed for dynamically balancing a rotor.

Figure 3 represents a section on line 3—3 Figure 2, certain of the parts being shown in elevation.

Similar numerals of reference indicate corresponding parts.

The object and utility of this bearing is that it enables one to detect by low revolution the unbalanced portions of any revolving shaft, rotor or other machine part. The pendulum is so sensitive in its operation that it responds to the smallest vibration, which vibrations are measured by dial indicator mounted on stand, with contact on bearing. When revolving piece shows no vibration on indicator it is in balance.

In carrying out, by my novel invention, the feature of dynamically balancing the rotor, I mount the ends of its shaft 2 in the novel floating boxes or oscillating bearings 3, whose detailed construction will be understood from Figures 2 and 3 and which are arranged in pairs, as seen in Figure 1, and as the construction of each oscillating bearing and its adjuncts is substantially the same, a description of one will suffice for both.

Each bearing 3 comprises the upper member 4 and lower member 5, which latter is supported on and is integral with the depending arm 6, whose lower end is mounted or fulcrumed on the pin or rod 7, whose ends are mounted in the bosses 8 of the sides 9 of the pedestal or housing 10 having the end walls 11, said pendant arm 6 thus forming an inverted pendulum. The rod 7 is held in position by the pins 12 and washers 13 or any other convenient or suitable fastening means. The pendant arm 6 has the strengthening web 14 on each side thereof, which is thickened on opposite sides to form bosses at about midway of its length, as indicated at 15, in which are inserted the threaded pins 16, whose ends are surrounded by the ends of the helical or coiled springs 17, whose opposite ends abut on the shouldered caps 18, which are centered on the ends 19 of the threaded stems 20, which engage the bosses 21 and are provided with the lock nuts 22, said stems having the squared ends 23 for convenience of manipulation. The bearings 4 and 5 are provided with a lining of Babbitt metal 24 or the like, or, if desired, suitable roller bearings may be employed, and said boxes are held in assembled position by the bolts 25, which engage the flanges 26 of the lower box 5, it being noticed that the outer ends of said flanges 26 terminate a short distance from the edges of the inwardly extending flange 27 at the top of the ends 11 of the housing or pedestal 10, which space is filled by the shims 28, which are adapted to be removed, according to requirements, as will be hereafter explained. 29, 30 and 31 designate oil holes for proper lubrication.

It will be seen from the foregoing that the bearings 3, when the shims 28 are removed, are capable of a slight oscillation upon the fulcrum pin or rod 7, and that further the movements of the inverted pendulum or pendant arm 6 are constrained by the helical springs 17 and their tension adjustments, so that when the rotor shaft 2 is placed in the bearings 3 and revolved therein, it is free to move within the limits of the housing 10 and springs 17. It is further obvious that by pivoting the pendant arm 6 at 7, that any tendency of vertical motion of the bearing 3 is eliminated. These pendulum bearings 3 in practice act with such sensitiveness, that if the rotor is out of balance dynamically, they will oscillate violently, when the rotor is turning slowly. The rotor 1 is caused to revolve by a suitable electric motor 32, whose shaft 33 carries any suitable jaw clutch 34, whose lugs 35 are adapted to engage or interlock with aligning holes in the flange or its equivalent 36 of the rotor shaft 2, as will be understood from Figure 4, it only being essential that provision be made for the clutch to be disconnected from the rotor shaft 2 while the rotor is revolving, the revolutions of the rotor 1 and its shaft continuing during the testing or balancing operation until the rotor comes to rest.

The operation is as follows:—

The rotor 1 and its shaft 2 having been assembled with respect to the oscillating bearings 3, as shown in Figure 1, and the clutch 34 having been shifted to engage the rotor shaft flange 36, as seen in Figure 1, the electric motor 32 is started, and it will be apparent that said rotor, its shaft and the motor will revolve in unison, the revolutions being accelerated by the motor until some convenient or desirable predetermined speed is reached, between 300 and 500 R. P. M. having been found to be quite satisfactory. The rotor is disconnected from the motor by shifting the clutch handle to the right and allowed to come to rest from the resistance offered by windage and bearing friction. During the period of retardation, observations of the oscillation of the pendulum or bearings are taken by marking the shaft on each end with a pencil, the operator carefully holding his pencil and marking on the shaft 2, as it revolves or slows down.

To help show the lead pencil markings, the portions of the shaft where these markings are being made can be given a light coat of red lead each time. The direction of rotation of the motor 32 and shaft 2 is then reversed and new markings and observations made. One marking will be seen to be in advance of the other. A medial point between the two markings is made and trial weights are placed on the rotor, as indicated by the medial point. When the pendulums 6 do not oscillate appreciably during the entire period of retardation of the rotor, it will be in dynamic balance and the rotor, when placed within its casing and revolved under steam to a speed of 1800 to 2200 R. P. M., will be found to be entirely free from vibration. During the balancing, the shims 28 are removed.

It will be seen from the foregoing that by my novel invention, the handling of these rotors, which in practice weigh several tons, is reduced to a minimum, and after a rotor has been statically and dynamically balanced, as hereinbefore explained, it can be permanently assembled in the turbine casing with respect to its stator without there being any necessity of its removal from the same thereafter.

I have found in practice that a rotor of 70 inches diameter over blades, by 10 feet total length and weighing 7,000 pounds driven by a 50 H. P. motor in open air at 500 R. P. M., can be perfectly balanced dynamically by my invention in two to three hours' time, which is a great advantage and saving of expense over other methods of balancing, which have heretofore required several days to a week.

I am also enabled by my invention, to effectively balance in a few hours, that which before took several days.

It will be apparent to those skilled in the art, that it is essential that a device of this character be strongly and rigidly constructed to support the heavy weight of the rotor, which I accomplish by the provision of the lower strengthening bosses 8, and I, in addition, strengthen and reinforce the pendant arm 6 by the provision of the central opposite webs 14.

It is also essential that means be provided for the adequate lubrication of the moving parts, which I effect by the provisions of the oil holes 29, 30 and 31.

So far as I am aware, I am the first in the art to produce or employ the novel method and apparatus I have hereinbefore described, and my claims to these features should be interpreted with the scope accorded to inventions of this character.

It will now be apparent that I have devised a novel and useful construction of an apparatus for securing and determining dynamic balance of turbine rotors, shafting and other revolving elements requiring dynamic balance, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a device of the character stated, a pair of inverted pendulum bearings having elongated pendant pendulums pivotally supported at their lower ends, a rotor and its shaft supported in said bearings, and means aligning with said rotor shaft and detachably connected with said rotor shaft for revolving it in opposite directions.

2. In a device of the character stated, a housing, an oscillating bearing for a rotor shaft located in the upper portion of said housing, an elongated arm depending from the bottom of said bearing, a pin passing through the lower portion of said arm and having its ends supported in the sides of said housing, and tension devices located below said bearing and common to said housing and pendant arm for limiting the oscillations of the latter.

3. In a device of the character stated, a housing having strengthening bosses at its lower portion, a pin mounted in said bosses, an arm fulcrumed on said pin and extending upwardly, a bearing for a rotor shaft carried by the upper extremity of said arm, and tension devices intermediate the inner walls of said housing and said arm, the upper inner portions of said housing being juxtaposed to opposite walls of said bearing to limit the oscillations of the latter but not to constrain the same.

4. In a device of the character stated, a housing having strengthening bosses at its lower portion, a pin mounted in said bosses, an arm fulcrumed on said pin and extending upwardly, a bearing for a rotary element in the upper extremity of said arm, helical springs intermediate the inner walls of said housing and said arm, caps intermediate said housing and springs and threaded stems carried by said housing and having their ends engaging said caps for varying the tension of said springs.

5. In a device of the character stated, a base, a crank pivotally secured to said base and capable only of circumferential movement, a journal bearing secured to one end of said crank and capable only of circumferential movement on said base, and tension devices secured to said base and crank and positioned between the journal bearing and the crank pivot, said tension devices being capable of movement only in a direction substantially at right angles to the longitudinal axis of the crank.

MORTON C. HUTCHINSON.

Witnesses:
   J. W. Meeker,
   John R. Harrof.